United States Patent
Ikeda et al.

(10) Patent No.: US 11,568,547 B2
(45) Date of Patent: Jan. 31, 2023

(54) DEPOSIT DETECTION DEVICE AND DEPOSIT DETECTION METHOD

(71) Applicant: DENSO TEN Limited, Kobe (JP)

(72) Inventors: Nobuhisa Ikeda, Kobe (JP); Nobunori Asayama, Kobe (JP); Takashi Kono, Kobe (JP); Yasushi Tani, Kobe (JP); Daisuke Yamamoto, Kobe (JP); Daisuke Shiota, Kobe (JP); Teruhiko Kamibayashi, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/019,534

(22) Filed: Sep. 14, 2020

(65) Prior Publication Data

US 2021/0090268 A1   Mar. 25, 2021

(30) Foreign Application Priority Data

Sep. 20, 2019  (JP) .............................. JP2019-172202

(51) Int. Cl.
*G06T 7/70* (2017.01)
*G06T 7/215* (2017.01)

(52) U.S. Cl.
CPC ................ *G06T 7/215* (2017.01); *G06T 7/70* (2017.01)

(58) Field of Classification Search
CPC . G06T 7/215; G06T 7/70; G06T 2207/30168; G06T 2207/30252
See application file for complete search history.

(56) References Cited

U.S. PATENT DOCUMENTS

| | | | |
|---|---|---|---|
| 2014/0010408 A1* | 1/2014 | Irie | G06T 7/0002 382/103 |
| 2014/0232869 A1* | 8/2014 | May | G06T 7/70 348/148 |
| 2014/0270379 A1* | 9/2014 | Snider | B60R 1/00 382/104 |
| 2016/0282874 A1* | 9/2016 | Kurata | G05D 1/0223 |
| 2018/0114089 A1* | 4/2018 | Ikeda | G06V 10/751 |
| 2019/0322245 A1* | 10/2019 | Kline | B60S 1/0848 |

FOREIGN PATENT DOCUMENTS

| | | |
|---|---|---|
| JP | 2015-215645 A | 12/2015 |
| JP | 2019-029940 A | 2/2019 |
| JP | 2019-032619 A | 2/2019 |

* cited by examiner

*Primary Examiner* — Syed Haider
(74) *Attorney, Agent, or Firm* — Oliff PLC

(57) ABSTRACT

A deposit detection device according to an embodiment includes an adhesion detection module, a moving adhesion detection module, and a determination module. The adhesion detection module detects a deposit region corresponding to a deposit adhering to an imaging device, based on brightness information of an image captured by the imaging device. The moving adhesion detection module detects the deposit region detected during moving of the vehicle as a moving deposit region, from among the deposit regions detected by the adhesion detection module. When the area of the moving deposit region detected by the moving adhesion detection module is equal to or larger than a first threshold value, the determination module determines that there is a deposit.

6 Claims, 11 Drawing Sheets

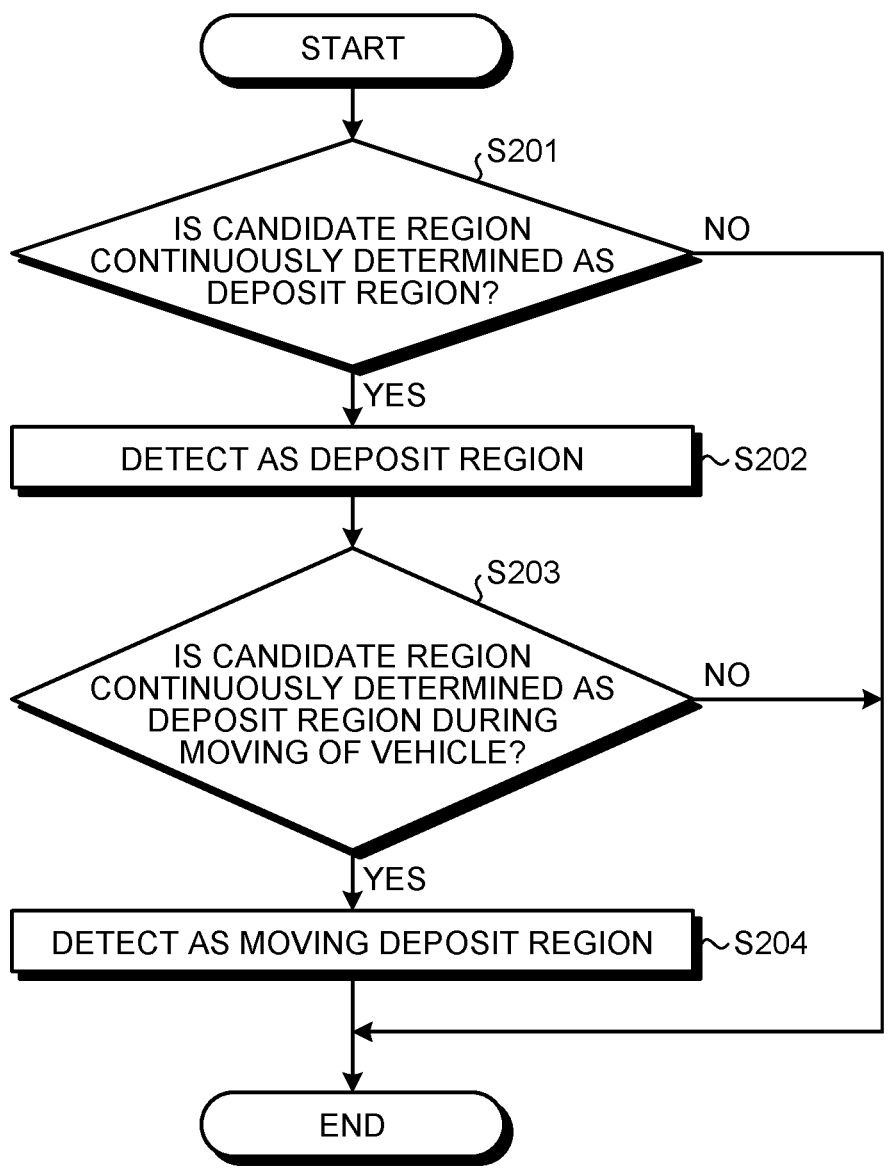

DEPOSIT DETECTION DEVICE AND DEPOSIT DETECTION METHOD

CROSS-REFERENCE TO RELATED APPLICATION

This application is based upon and claims the benefit of priority of the prior Japanese Patent Application No. 2019-172202, filed on Sep. 20, 2019, the entire contents of which are incorporated herein by reference.

FIELD

The embodiments discussed herein are directed to a deposit detection device and a deposit detection method.

BACKGROUND

Conventionally, a deposit detection device is known which detects that there is a deposit when a region corresponding to a deposit adhering to a lens of an imaging device is equal to or larger than a predetermined area, based on brightness information of a captured image (for example, refer to Japanese Laid-open Patent Publication No. 2019-29940).

Unfortunately, the conventional technique has room for improvement in detecting a deposit with high accuracy. For example, conventionally, a deposit region with an area of a certain size needs to be detected in order to detect that there is a deposit, in terms of maintaining the reliability of the detection result. It therefore has been necessary to detect a deposit region of higher possibility in order to detect a small amount of adhesion.

SUMMARY

A deposit detection device according to an embodiment includes an adhesion detection module, a moving adhesion detection module, and a determination module. The adhesion detection module detects a deposit region corresponding to a deposit adhering to an imaging device, based on brightness information of an image captured by the imaging device. The moving adhesion detection module detects the deposit region detected during moving of the vehicle as a moving deposit region, from among the deposit regions detected by the adhesion detection module. When the area of the moving deposit region detected by the moving adhesion detection module is equal to or larger than a first threshold value, the determination module determines that there is a deposit.

BRIEF DESCRIPTION OF DRAWINGS

FIG. 12 is a flowchart illustrating the procedure of a detection process performed by the deposit detection device according to an embodiment.

DESCRIPTION OF EMBODIMENTS

Embodiments of a deposit detection device and a deposit detection method disclosed by the subject application will be described in detail below with reference to the accompanying drawings. It should be noted that the present invention is not limited by the embodiments illustrated below.

Figure 1:
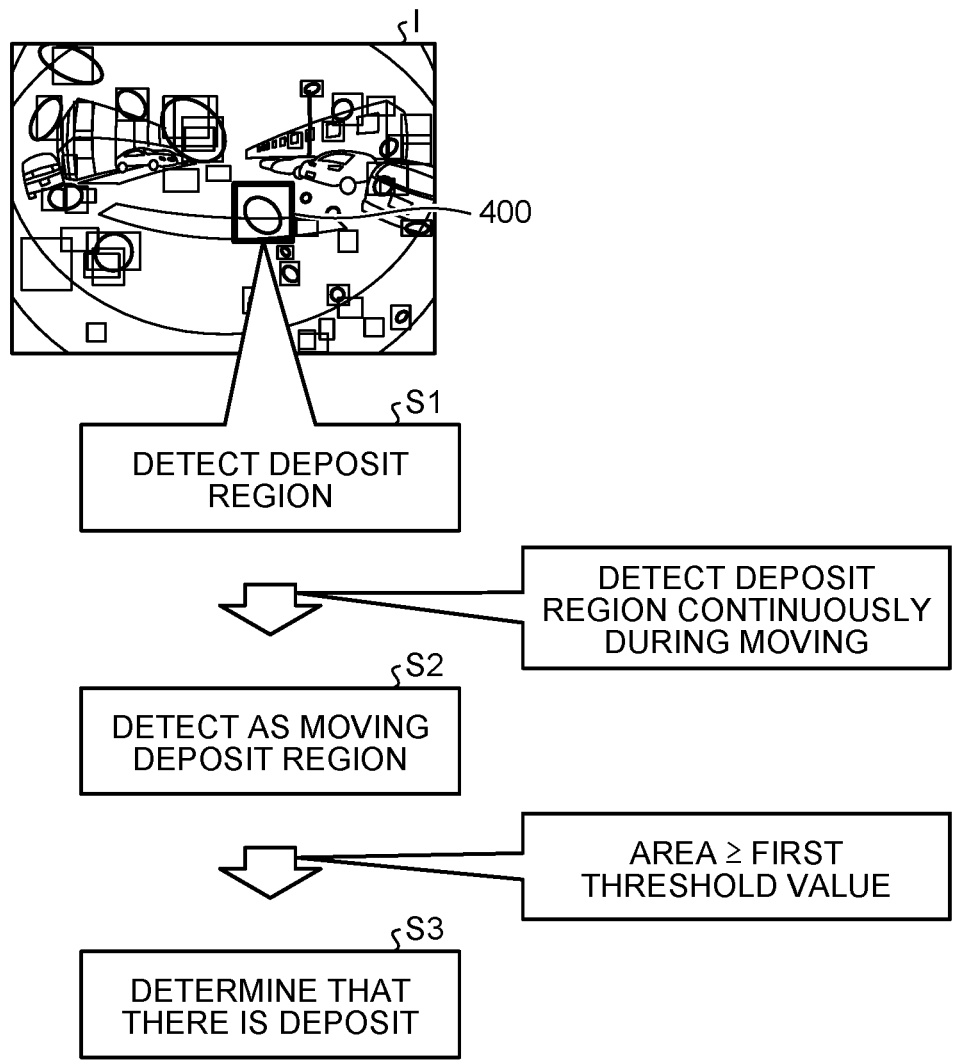
FIG. 1 is a diagram illustrating an overview of a deposit detection method according to an embodiment.

First, referring to FIG. 1, an overview of the deposit detection method according to an embodiment will be described. FIG. 1 is a diagram illustrating the overview of the deposit detection method according to an embodiment. FIG. 1 illustrates a captured image I captured, for example, in a state in which a water droplet such as a rain drop adheres to a lens of an on-vehicle camera (an example of an imaging device).

When deposits such as dirt, dust, rain drops, and snowflakes adhere to the lens of the camera, information on the surroundings of the vehicle, for example, parking lines, other vehicles, and persons fail to be acquired from the captured image I. Consequently, the parking lines, the other vehicles, the persons, and the like may fail to be detected correctly. Deposits are not limited to dirt, dust, rain drops, and snowflakes and may be any deposit that blurs the region of the deposit.

A deposit detection device 1 (refer to FIG. 2) according to an embodiment performs the deposit detection method to detect a deposit region corresponding to a deposit adhering to the lens of the camera based on the captured image I captured by the camera. When the deposit region is continuously detected during moving of the vehicle, the deposit detection device 1 according to an embodiment further detects the deposit region as a moving deposit region.

Specifically, in the deposit detection method according to an embodiment, first, a deposit region 400 corresponding to a deposit adhering to the camera is detected based on brightness information of the captured image I captured by the camera (step S1). Examples of the method of detecting the deposit region 400 include a method of detecting a blurred region such as a rain drop, a method of detecting a blocked-up shadow region such as dirt, and a method of detecting a rough region due to irregular reflection by snow or the like.

For example, in the case of a blurred region, a blurred region such as a rain drop is detected as the deposit region 400 by analyzing a brightness distribution in a rectangular region including a circular profile of a rain drop or the like extracted by pattern matching based on edges detected from the pixels of the captured image I.

For example, in the case of a blocked-up shadow region, the captured image I is divided into a plurality of small regions, and a small region with brightness and brightness information that are determined per small region to be low and less varied than that in the past, respectively, is detected as the deposit region 400 that is a blocked-up shadow region such as dirt.

For example, in the case of a rough region, a region in which the edges detected from the pixels of the captured image I are oriented in various directions is detected as a deposit region 400 that is a rough region such as snow.

In the embodiments described below, a blurred region such as a rain drop is detected as the deposit region 400, as an example.

Subsequently, as illustrated in FIG. 1, in the deposit detection method according to an embodiment, a deposit region 400 detected during moving of the vehicle is detected as a moving deposit region, from among the detected deposit regions 400 (step S2). The detail of the method of detecting a deposit region 400 as a moving deposit region will be described later.

Subsequently, in the deposit detection method according to an embodiment, if the area of the detected moving deposit region is equal to or larger than a first threshold value, it is determined that there is a deposit (step S3). In the deposit detection method according to an embodiment, if the area of the deposit region 400 is equal to or greater than a second threshold value, it is also determined that there is a deposit. The first threshold value is set to a value smaller than the second threshold value.

That is, in the deposit detection method according to an embodiment, it is determined that there is a deposit with a smaller area in a moving deposit region, than in the deposit region 400. In other words, for the moving deposit region, it is determined that there is a deposit with a smaller amount of adhesion than that of the normal deposit region 400.

In this way, the first threshold value can be set to a lower value than the second threshold value, because the possibility of the moving deposit region is high. In other words, the moving deposit region has a high possibility as a deposit because the moving deposit region is detected even when the background (brightness information) of the captured image I changes with moving of the vehicle, and the adhesion is so firm that it is not removed even by vibration of the vehicle caused by moving.

In this way, in the deposit detection method according to an embodiment, the moving deposit region of a high possibility is detected whereby it can be determined that there is a deposit even with a small amount of adhesion. The deposit detection method according to an embodiment therefore can detect a deposit with high accuracy.

Figure 2:
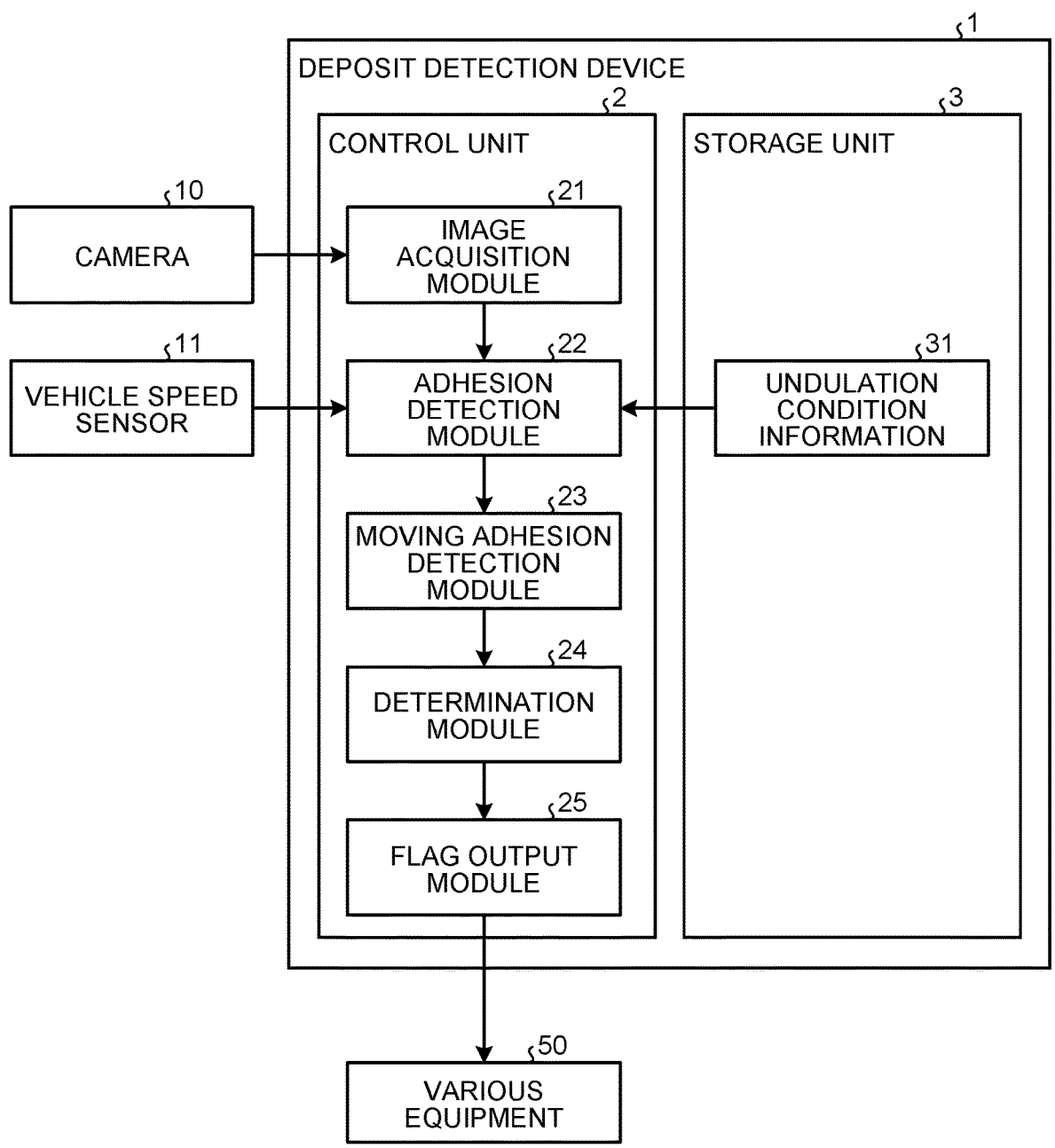
FIG. 2 is a block diagram illustrating a configuration of a deposit detection device according to an embodiment.

Referring now to FIG. 2, a configuration of the deposit detection device 1 according to an embodiment will be described. FIG. 2 is a block diagram illustrating the configuration of the deposit detection device 1 according to an embodiment. As illustrated in FIG. 2, the deposit detection device 1 according to an embodiment is connected with a camera 10, a vehicle speed sensor 11, and various equipment 50. Although the deposit detection device 1 illustrated in FIG. 2 is a separate component from the camera 10 and the various equipment 50, the deposit detection device 1 may be integrated with at least one of the camera 10 and the various equipment 50.

The camera 10 is, for example, an on-vehicle camera including a lens such as a fish-eye lens and an imager such as a charge-coupled device (CCD) or a complementary metal oxide semiconductor (CMOS). The cameras 10 are provided, for example, at positions where images at the front, back, and sides of the vehicle can be captured, and output the captured images I to the deposit detection device 1.

The vehicle speed sensor 11 is a sensor that detects the speed of the vehicle (vehicle speed). The vehicle speed sensor 11 outputs information on the detected vehicle speed to the deposit detection device 1. The vehicle speed sensor 11 may be eliminated and, for example, the deposit detection device 1 may calculate information on the vehicle speed based on time-series images from the camera 10.

The various equipment 50 acquires the detection result from the deposit detection device 1 to perform a variety of control on the vehicle. The various equipment 50 includes, for example, a display device indicating that a deposit adheres to the lens of the camera 10 and notifies the user of an instruction to wipe off the deposit, a removal device that ejects fluid, gas, or the like toward the lens to remove the deposit, and a vehicle control device for controlling autonomous driving, for example.

As illustrated in FIG. 2, the deposit detection device 1 according to an embodiment includes a control unit 2 and a storage unit 3. The control unit 2 includes an image acquisition module 21, an adhesion detection module 22, a moving adhesion detection module 23, the determination module 22, and a flag output module 25. The storage unit 3 stores therein undulation condition information 31.

Here, the deposit detection device 1 includes, for example, a computer having a central processing unit (CPU), a read-only memory (ROM), a random-access memory (RAM), a data flash, and an input-output port, and a variety of circuits.

The CPU of the computer reads and executes a computer program stored in the ROM, for example, to function as the image acquisition module 21, the adhesion detection module 22, the moving adhesion detection module 23, the determination module 22, and the flag output module 25 of the control unit 2.

At least one or all of the image acquisition module 21, the adhesion detection module 22, the moving adhesion detection module 23, the determination module 22, and the flag output module 25 of the control unit 2 may be configured by hardware such as an application specific integrated circuit (ASIC) and a field-programmable gate array (FPGA).

The storage unit 3 corresponds to, for example, the RAM and the data flash. The RAM and the data flash can store therein the undulation condition information 31 and information of a variety of computer programs. The deposit detection device 1 may acquire the computer program and/or a variety of information described above through another computer connected via a wired or wireless network or a portable recording medium.

The undulation condition information 31 stored in the storage unit 3 is information including a condition serving as a criterion in a process by the adhesion detection module 22 described later and includes, for example, a pattern condition of undulation of a brightness distribution (a distribution of brightness averages). The pattern condition is a change pattern of change in undulation in the distribution of brightness averages and a possible threshold value range of brightness of each pixel (unit region R) in the brightness distribution. The process using the undulation condition information 31 will be described later.

The image acquisition module 21 acquires an image captured by the camera 10 and generates (acquires) a current frame that is the captured image I at present. Specifically, the image acquisition module 21 performs a gray-scale process of converting each pixel in the acquired image into grayscale gradation from white to black according to its brightness.

The image acquisition module 21 also performs a pixel thinning process on the acquired image and generates an image having a size smaller than the acquired image. The image acquisition module 21 generates a current frame that is an integrated image of the sum and the sum of squares of pixel values in the pixels, based on the image subjected to the thinning process. As used herein, a pixel value is information corresponding to brightness or an edge of a pixel.

In this way, the deposit detection device can accelerate calculation in the processes in the subsequent stages by performing the thinning process on the acquired image and generating the integrated image and can reduce the process time for detecting a deposit.

The image acquisition module 21 may perform a smoothing process for each pixel, using a smoothing filter such as an averaging filter. The image acquisition module 21 does not necessarily perform the thinning process and may generate a current frame having the same size as that of the acquired image. Hereinafter the current frame may be referred to as captured image I.

The adhesion detection module 22 detects the deposit region 400, based on the brightness information of the captured image I acquired by the image acquisition module 21. The brightness information is, for example, an average value of brightness, a standard deviation of brightness, and edge information.

First of all, the adhesion detection module 22 extracts a candidate region 100 for the deposit region 400 from the captured image I, based on edges detected from the pixels of the captured image I acquired by the image acquisition module 21. Specifically, first, the adhesion detection module 22 extracts brightness and edge information of each pixel in the captured image I. The brightness of each pixel is represented by, for example, a parameter from 0 to 255.

The adhesion detection module 22 performs an edge detection process based on the brightness of each pixel to detect an edge in an X-axis direction (the right-left direction in the captured image I) and an edge in a Y-axis direction (the top-bottom direction in the captured image I) for each pixel. In the edge detection process, for example, any edge detection filter such as a Sobel filter and a Prewitt filter can be used.

The adhesion detection module 22 then detects a vector including information on the edge angle and the edge intensity of the pixel as edge information, using a trigonometric function, based on the edge in the X-axis direction and the edge in the Y-axis direction. Specifically, the edge angle is represented by the direction of the vector and the edge intensity is represented by the length of the vector.

The adhesion detection module 22 then performs a matching process (template matching) between template information indicating the profile of a deposit created in advance and the detected edge information and extracts edge information similar to the template information. The adhesion detection module 22 then extracts the candidate region 100 that is a region with the extracted edge information, that is, a rectangular region including the profile of a deposit.

Subsequently, the adhesion detection module 22 divides a plurality of successive pixel rows in the extracted candidate region 100 into unit regions R, each including a predetermined number of pixels as a unit, and calculates an average value of brightness and a standard deviation of brightness for each unit region R.

Referring now to FIG. 3A to FIG. 4B, the process in the adhesion detection module 22 will be described. FIG. 3A to FIG. 4B are diagrams illustrating the process in the adhesion detection module 22.

Figure 3A:
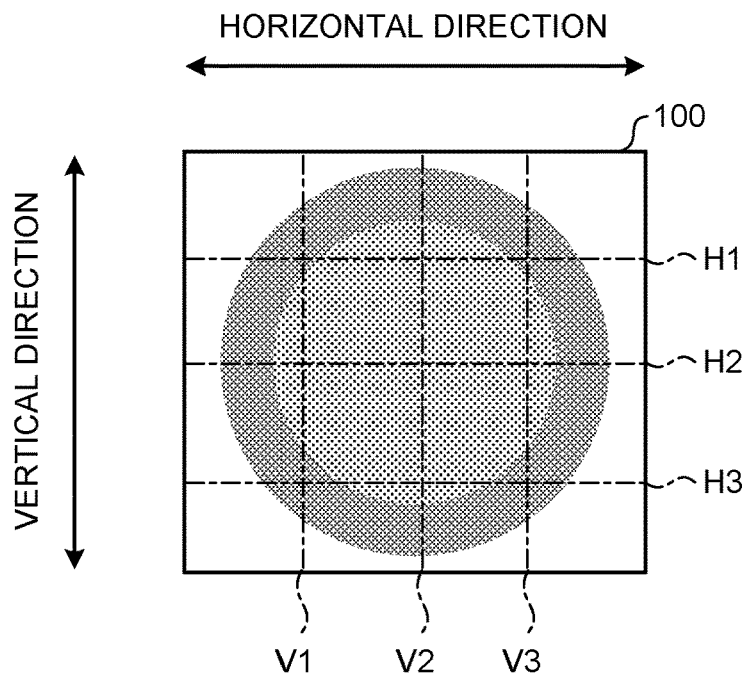
FIG. 3A is a diagram illustrating a process in an adhesion detection module.
Figure 3B:
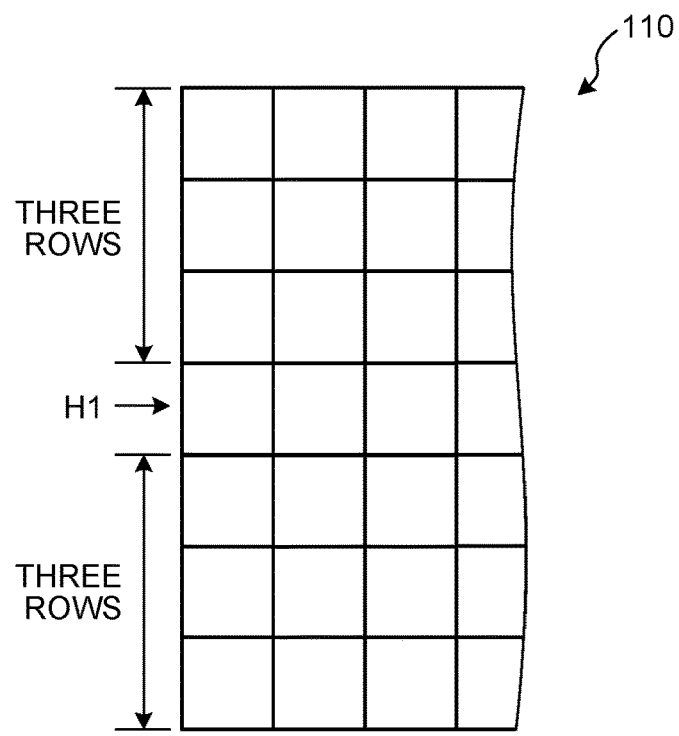
FIG. 3B is a diagram illustrating the process in the adhesion detection module.

As illustrated in FIG. 3A and FIG. 3B, first, the adhesion detection module 22 sets a plurality of successive pixel rows in the candidate region 100, as a strip region 110. Such a strip region 110 is a region subjected to a division process for the unit regions R and a calculation process for the brightness information (average value and standard deviation) at the subsequent stages.

Specifically, as illustrated in FIG. 3A, first, the adhesion detection module 22 selects three pixel rows H1 to H3 in the horizontal direction and three pixel rows V1 to V3 in the vertical direction in the candidate region 100. For the selected pixel rows, the adhesion detection module 22 then sets a plurality of pixel rows including the selected pixel rows as the strip region 110.

FIG. 3B illustrates the strip region 110 including the pixel row H1 in the horizontal direction. The method of setting the strip region 110 including a pixel row in the vertical direction is substantially the same as the method of setting the strip region 110 including the pixel row H1 in the horizontal direction described below (different only in whether the pixel row is horizontal or vertical), and a description thereof is omitted.

As illustrated in FIG. 3B, the adhesion detection module 22 sets a plurality of successive pixel rows in the vertical direction including the selected pixel row H1 at the center, as the strip region 110. In other words, the adhesion detection module 22 sets the selected pixel row H1 and a plurality of pixel rows parallel to the pixel row H1 and adjacent to each other, as the strip region 110.

In FIG. 3B, seven pixel rows in total including one pixel row H1 and three successive pixel rows on each of the upper side and the lower side in the vertical direction of the horizontal pixel row H1 (six pixel rows in total) are set as the strip region 110.

The position of the pixel row H1 in the strip region 110 is not necessarily the center of the strip region 110 and may be shifted to either of the upper side or the lower side in the vertical direction. There may be two or less or four or more successive pixel rows on each of the upper side and the lower side in the vertical direction of the pixel row H1.

The selected pixel rows H1 to H3 and V1 to V3 may be pixel rows in the direction of either the pixel rows H1 to H3 in the horizontal direction or the pixel rows V1 to V3 in the vertical direction. The number of pixel rows H1 to H3 and V1 to V3 selected in each direction is not limited to three and may be two or less or four or more.

Figure 4A:
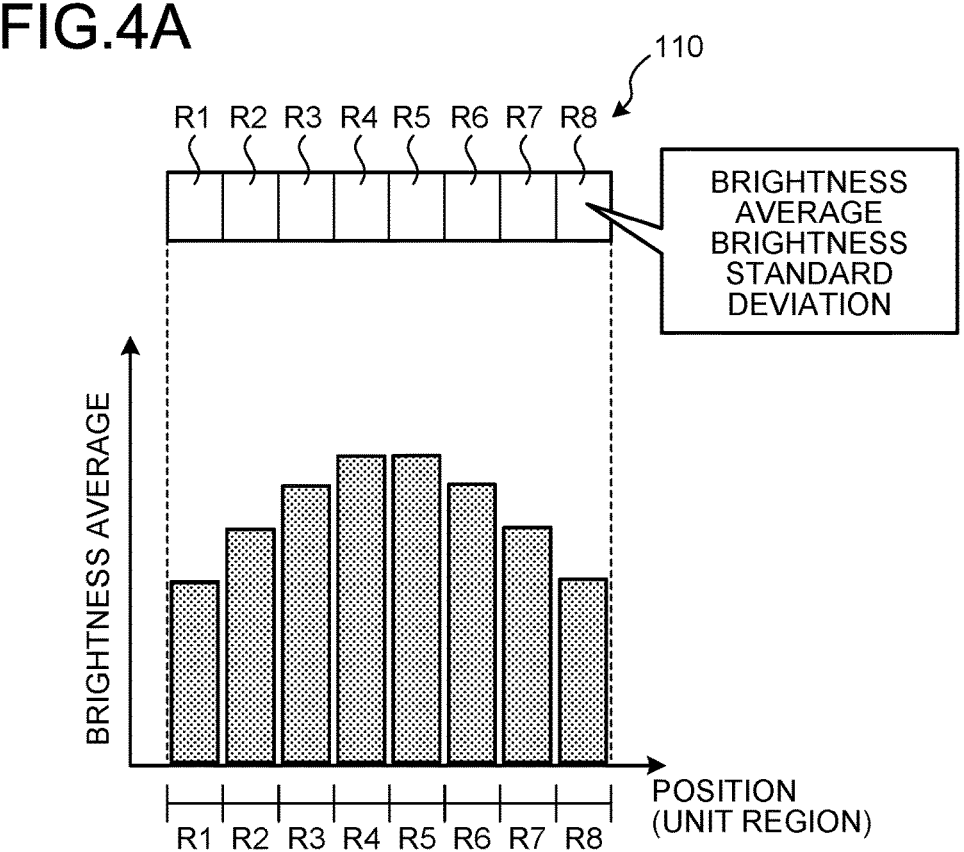
FIG. 4A is a diagram illustrating the process in the adhesion detection module.

Subsequently, as illustrated in FIG. 4A, the adhesion detection module 22 divides the set strip region 110 into unit regions R1 to R8, each including a predetermined number of pixels as a unit, and calculates an average value of brightness and a standard deviation of brightness for each of the unit regions R1 to R8.

In FIG. 4A, the adhesion detection module 22 sets the eight unit regions R1 to R8 obtained by dividing the strip region 110 at regular intervals (the same number of pixels). However, the number of unit regions R may be six or less or may be nine or more. The number of pixels included in each unit region R may be the same or may be different.

When the calculated standard deviation of brightness is smaller than a predetermined value, the adhesion detection module 22 sets the average value of brightness as a representative value of the unit region R in the strip region 110.

Figure 4B:
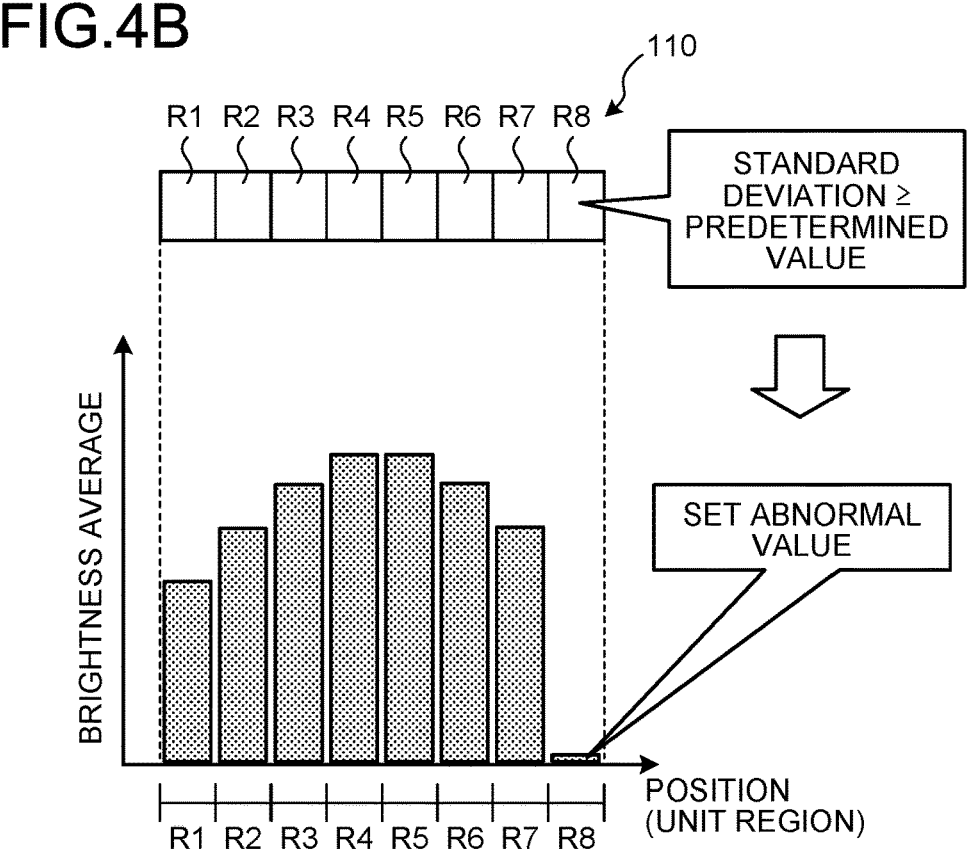
FIG. 4B is a diagram illustrating the process in the adhesion detection module.

On the other hand, as illustrated in FIG. 4B, when the calculated standard deviation of brightness is equal to or larger than a predetermined value, the adhesion detection module 22 sets a predetermined abnormal value as a representative value of the unit region R, instead of the brightness average of the unit region R, as a distribution of brightness averages in the strip region 110.

In the example illustrated in FIG. 4B, for the unit region R8, when the standard deviation of brightness is equal to or larger than the predetermined value, the adhesion detection module 22 sets a predetermined abnormal value (for example, minimum value or zero) as a representative value of the unit region R8, instead of the average value of brightness of the unit region R8.

This abnormal value is a value for determining the candidate region 100 as being not a deposit region 400 in a subsequent process. For example, when the deposit region 400 is determined by whether the distribution of brightness averages matches a predetermined pattern in the subsequent process, the adhesion detection module 22 sets an abnormal value that does not match the predetermined pattern. That is, when the standard deviation of the unit region R is equal to or larger than the predetermined value in the subsequent process, the adhesion detection module 22 determines that the candidate region 100 is not a deposit region 400. This process can suppress erroneous determination of a candidate region 100 including a noise component as a deposit region 400.

The adhesion detection module 22 sets the abnormal value by which a candidate region 100 is determined as not being a deposit region 400 in the subsequent process and can eliminate the candidate region 100 that is not a deposit region 400 without adding a new process, thereby suppressing complication of the process.

The adhesion detection module 22 uses the average value of brightness as the representative value of the unit region R. However, for example, a histogram of brightness may be constructed for each of the unit regions R1 to R8, and the mode, median value, average value, or the like in the histogram may be set as the representative value.

The adhesion detection module 22 determines whether the candidate region 100 is a deposit region 400 based on undulation in the distribution of brightness averages calculated for each unit region R by the adhesion detection module 22.

First, when the brightness distribution (the distribution of brightness averages) of the pixels included in the candidate region 100 satisfies a predetermined exception condition, the adhesion detection module 22 excludes the candidate region 100 from the determination process for a deposit region 400.

Figure 5:
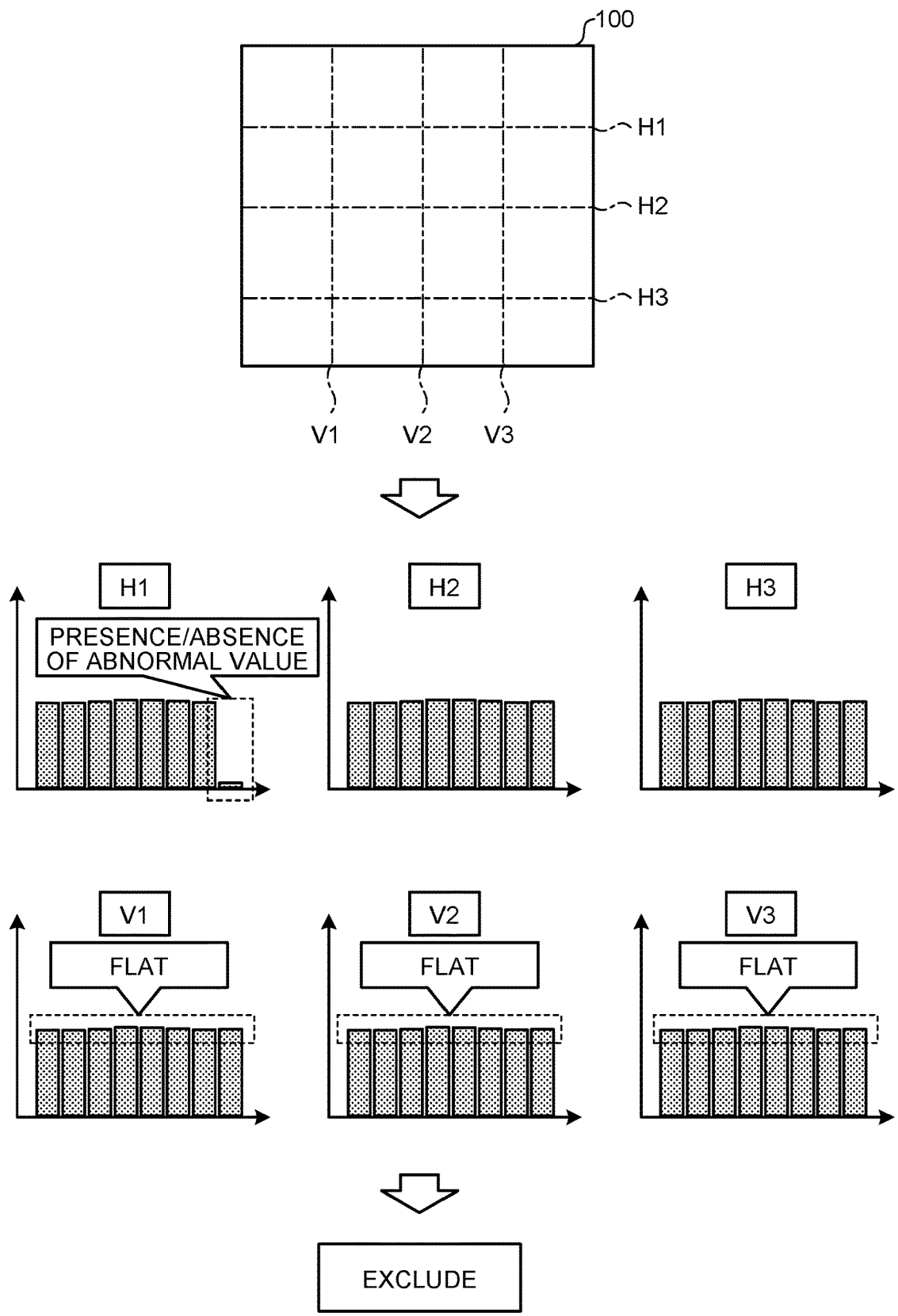
FIG. 5 is a diagram illustrating an exclusion process by the adhesion detection module.

The exclusion process for the candidate region 100 by the adhesion detection module 22 will now be described with reference to FIG. 5. FIG. 5 is a diagram illustrating the exclusion process by the adhesion detection module 22. FIG. 5 illustrates a distribution of brightness average for each strip region 110 calculated from a predetermined candidate region 100. FIG. 5 illustrates the distribution of brightness average for each of the strip regions 110 corresponding to the pixel rows H1 to H3 and V1 to V3 set in the candidate region 100. For example, in FIG. 5, the graph "H1" illustrates a distribution of brightness averages of the unit regions R in the strip region 110 including the pixel row H1.

The adhesion detection module 22 excludes the candidate region 100 from the determination process for a deposit region 400 when the undulation in the distribution of brightness average for each of the strip regions 110 corresponding to the pixel rows H1 to H3 and V1 to V3 satisfies a predetermined exception condition.

For example, when the representative value of a unit region R included in the strip region 110 includes an abnormal value, the adhesion detection module 22 excludes the candidate region 100 from the determination process for a deposit region 400. In other words, when the difference in representative value between two adjacent unit regions R in the strip region 110 is equal to or larger than a predetermined value, the adhesion detection module 22 excludes the candidate region 100 from the determination process for a deposit region 400.

In other words, the adhesion detection module 22 excludes the candidate region 100 from the determination process for a deposit region 400 when the unit regions R in the strip region 110 include a unit region R in which the standard deviation of the representative value is equal to or larger than a predetermined value (that is, the unit region R for which an abnormal value is set).

That is, when a part of the undulation in the distribution of brightness averages has a shape of a steep protrusion and a depression due to the abnormal value, the adhesion detection module 22 considers that the exception condition is satisfied and excludes the candidate region 100 from the determination process for a deposit region 400. In this way, the adhesion detection module 22 can remove a region that is not a deposit, with high accuracy, by performing the exclusion process (in other words, a process of determining the candidate region 100 as being not a deposit region 400) based on the abnormal value.

As illustrated in the graphs of the pixel rows V1 to V3 in FIG. 5, when the undulation in the distribution of brightness averages of the unit regions R is flat in all the three graphs, that is, when a change in the undulation of brightness averages is within a predetermined range for all the three strip regions 110 corresponding to the pixel rows V1 to V3 in the vertical direction, the adhesion detection module 22 excludes the candidate region 100 from the determination process for a deposit region 400. Specifically, an experiment has revealed that when light of the rear lamp is reflected on a wall in the candidate region 100, the distribution of brightness averages of the unit regions R tends to be flat. Then, when a change in the undulation of brightness average is within a predetermined range, it is determined that the candidate region 100 is produced by reflection from the rear lamp, and the candidate region 100 is excluded from the determination process for a deposit region 400.

FIG. 5 illustrates a case where three brightness distributions in the pixel rows V1 to V3 in the vertical direction are flat. However, the candidate region 100 may be excluded from the determination process for a deposit region 400 when three brightness distributions in the pixel rows H1 to H3 in the horizontal direction are flat or when six brightness distributions in the pixel rows H1 to H3 and V1 to V3 in the vertical direction and the horizontal direction are flat. That is, when a change in the undulation of brightness distribution of at least one pixel row of the pixel rows in the vertical direction and in the horizontal direction in the candidate region 100 is within a predetermined range, the adhesion detection module 22 considers that the exception condition is satisfied and excludes the candidate region 100 from the determination process for a deposit region 400.

In this way, when the undulation of the brightness distribution in the candidate region 100 satisfies a predetermined exception condition, the adhesion detection module 22 excludes such a candidate region 100 from the determination process for a deposit region 400 and thereby can reduce erroneous determination for a deposit region 400. That is, a deposit can be detected with high accuracy.

Figure 6:
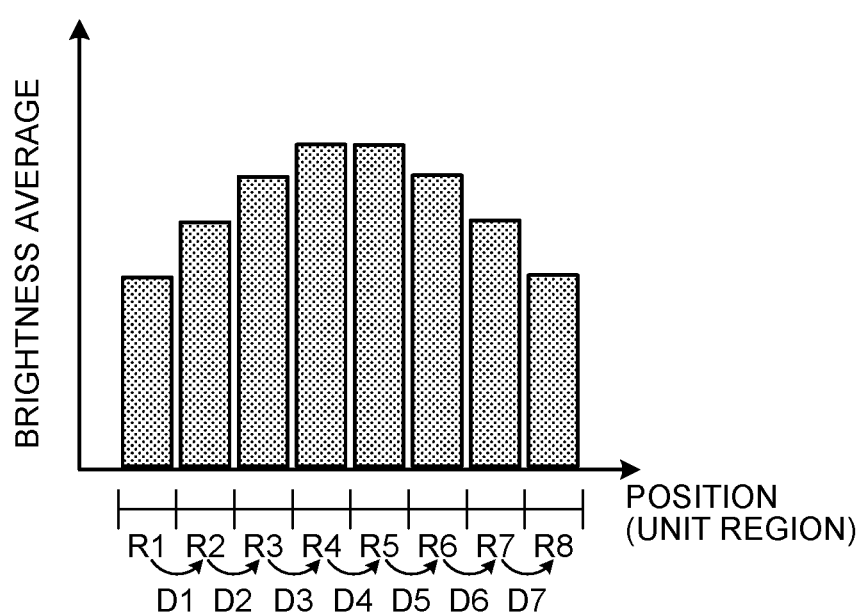
FIG. 6 is a diagram illustrating a determination process by the adhesion detection module.

Subsequently, the adhesion detection module 22 performs a determination process as to whether the candidate region 100 is a deposit region 400, for the candidate regions 100 other than the candidate region 100 excluded by the exception condition. Referring now to FIG. 6, the determination process by the adhesion detection module 22 will be described.

FIG. 6 is a diagram illustrating the determination process by the adhesion detection module 22. First of all, as illustrated in FIG. 6, the adhesion detection module 22 calculates, for each strip region 110, amounts of change D1 to D7 in brightness average in the adjacent unit regions R1 to R8.

The adhesion detection module 22 then determines that the candidate region 100 is a deposit region 400 when, of the strip regions 110 in the candidate region 100, there is a strip region 110 in which the pattern of undulation change in distribution of brightness averages of the unit regions R satisfies a predetermined change pattern. For example, the adhesion detection module 22 performs the determination process by comparing the values of the amounts of change D1 to D7 with the value of the change pattern included in the undulation condition information 31 stored in the storage unit 3. The change pattern included in the undulation condition information 31 is a threshold value range of possible maximum and minimum values of the amounts of change D1 to D7.

That is, when the values of the calculated amounts of change D1 to D7 are within the respective threshold value ranges of the amounts of change D1 to D7 included in the undulation condition information 31, the adhesion detection module 22 determines that the candidate region 100 is a deposit region 400.

In other words, when the pattern of the amounts of change D1 to D7 in brightness average in the adjacent unit regions R1 to R8 satisfies the change pattern that is the threshold value range set in the undulation condition information 31, the adhesion detection module 22 determines that the candidate region 100 is a deposit region 400.

Since the maximum value and the minimum value of the amounts of change D1 to D7 are set to provide a range in the undulation condition information 31, the candidate region 100 can be detected as a deposit region 400 even when the undulation of the brightness distribution varies to some extent.

FIG. 6 illustrates a case where the threshold value ranges are set for all the amounts of change D1 to D7 for the undulation condition information 31. However, for example, when a deposit region 400 having a small size is to be detected, the threshold value range may be set for only some of the amounts of change D1 to D7.

The adhesion detection module 22 may calculate the amount of brightness change in a predetermined region for the candidate region 100 determined to be a deposit region 400 and perform an identification process of identifying the determination result of the deposit region 400 based on the calculated amount of brightness change. This point will be described with reference to FIG. 7 and FIG. 8.

Figure 7:
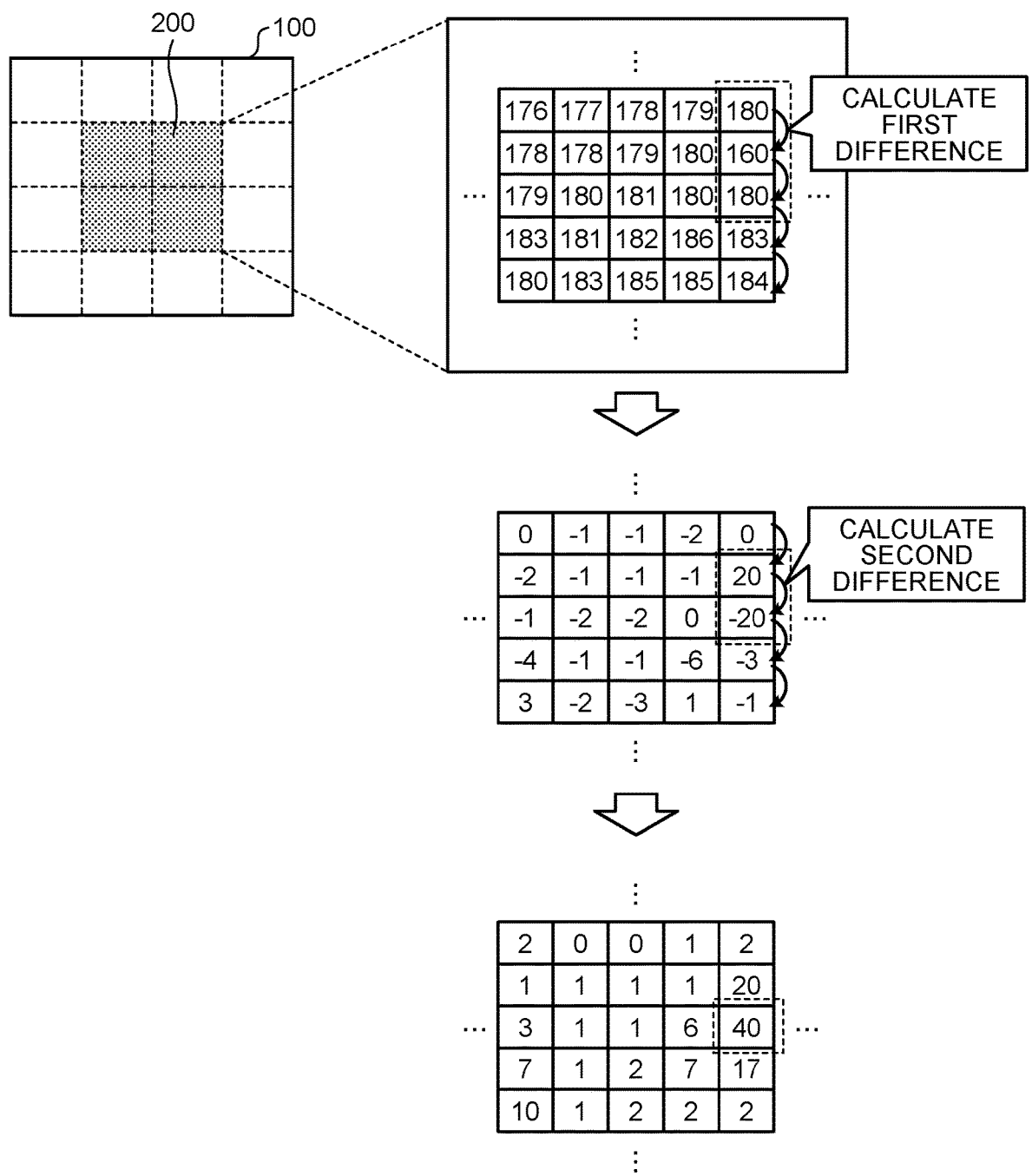
FIG. 7 is a diagram illustrating an identification process by the adhesion detection module.
Figure 8:
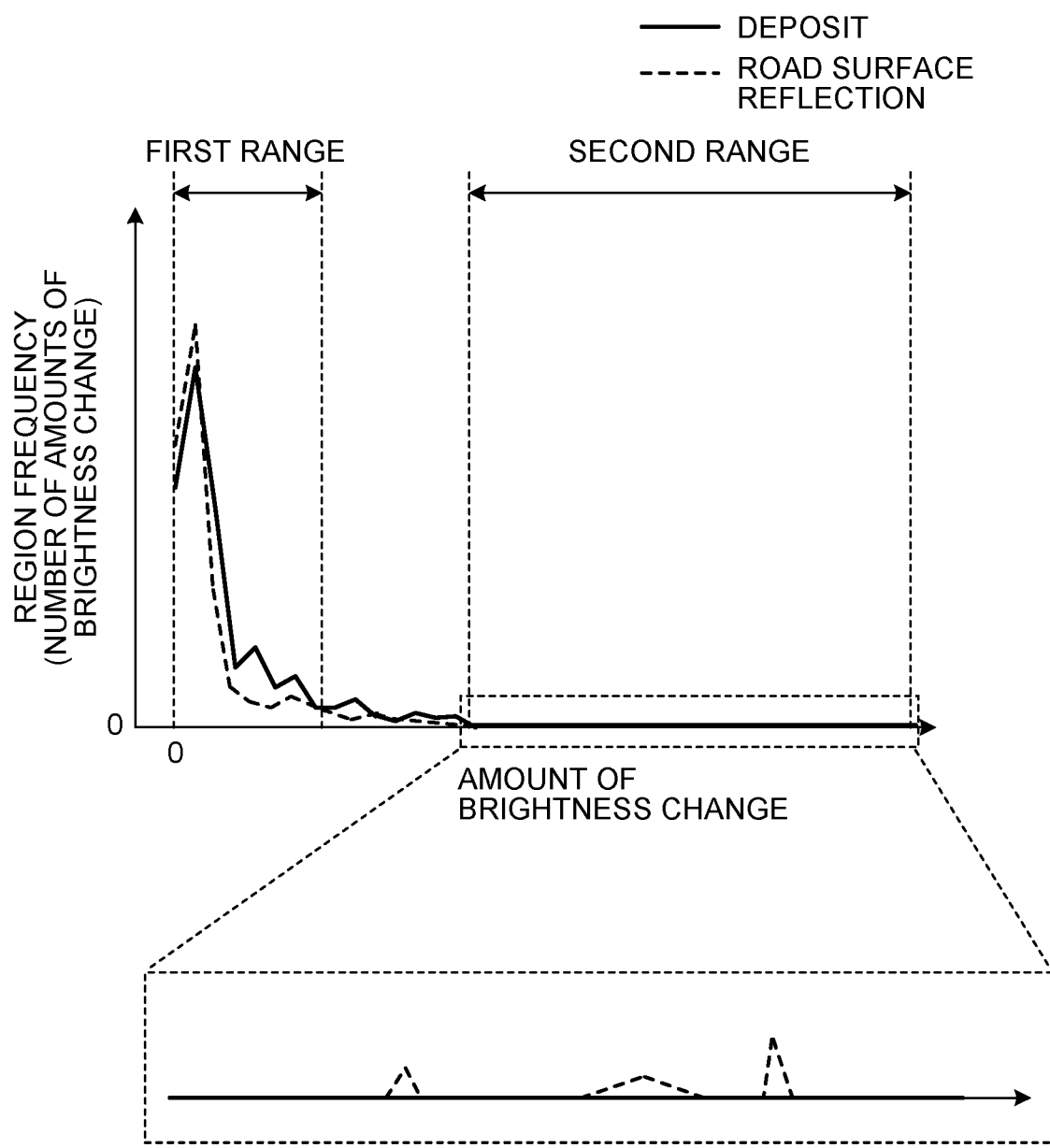
FIG. 8 is a diagram illustrating the identification process by the adhesion detection module.

FIG. 7 and FIG. 8 are diagrams illustrating the identification process for a deposit region 400 by the adhesion detection module 22. In the identification process, first, the adhesion detection module 22 calculates the amount of brightness change in a set of successive pixels in a predetermined direction in a predetermined internal region 200 in the candidate region 100 determined to be a deposit region 400.

Specifically, as illustrated in FIG. 7, the adhesion detection module 22 first sets an internal region 200 in the candidate region 100. For example, the adhesion detection module 22 divides the candidate region 100 into a predetermined number of regions in the vertical direction and the horizontal direction. Although FIG. 7 illustrates the candidate region 100 divided into four parts in each of the vertical direction and the horizontal direction, it may be divided into three or less parts or may be divided into five or more parts.

The adhesion detection module 22 then sets the central region of the divided regions divided into a predetermined number of parts, as the internal region 200. In FIG. 7, of 16 divided regions generated by dividing into four in each of the vertical direction and the horizontal direction, four divided regions that constitute the central region are set as the internal region 200.

The adhesion detection module 22 then calculates the amount of brightness change in a set of pixels in the internal region 200. In FIG. 7, the adhesion detection module 22 calculates the amount of brightness change in three successive pixels in the vertical direction. This is because a region of road surface reflection often extends in the vertical direction. The region of road surface reflection thus can be determined with high accuracy in the subsequent determination process. The adhesion detection module 22 may calculate the amount of brightness change in a set of successive pixels in the horizontal direction.

First of all, the adhesion detection module 22 calculates the brightness difference value between two adjacent pixels in the vertical direction, as a first difference. In the middle section of FIG. 7, cells are arranged in two dimensions corresponding to the array of pixels, where one cell has one first difference. That is, in the middle section of FIG. 7, one cell has a brightness difference value of two pixels adjacent in the vertical direction, that is, the first difference, and two cells adjacent in the vertical direction are two first differences calculated from three pixels.

Subsequently, the adhesion detection module 22 calculates a second difference that is a difference value between two successive first differences in the vertical direction. In the lower section of FIG. 7, cells are arranged in two dimensions corresponding to the array of pixels, where one cell has one second difference converted into an absolute value. That is, in the lower section of FIG. 7, one cell indicates one second difference (the amount of brightness change) calculated from three pixels. In other words, the second difference is the amount of change of the first differences.

In this way, one of the possible causes of the brightness steeply going up and down is, for example, a small dent in a road surface and the possibility of being a region of road surface reflection is high. The adhesion detection module 22 then calculates the second difference as the amount of brightness change in a set of pixels to easily determine whether the candidate region 100 is a deposit region 400 or a region of road surface reflection in a subsequent process. Specifically, in a region in which the brightness of three successive pixels goes up and down steeply ("180"→"160"→"180" illustrated in FIG. 7), for example, due to a small dent in a road surface, the second difference is high. That is, such a region in which the brightness steeply goes up and down can be easily identified by calculating the second difference, so that it is easily determined whether the candidate region is a deposit region or a region of road surface reflection in a subsequent process.

The adhesion detection module 22 uses the amount of brightness change in a set of pixels as the second difference but may use the amount of brightness change in a set of pixels as the first difference. When the first difference is the amount of brightness change in a set of pixels, the number of pixels in the set of pixels is two or more. Specifically, when the amount of brightness change in two pixels is calculated, calculated one first difference may be used as the amount of brightness change, or when the amount of brightness change in three or more pixels is calculated, the average value of calculated first differences may be used as the amount of brightness change.

Subsequently, the adhesion detection module 22 performs the identification process using the second difference that is the calculation result as the amount of brightness change in the set of pixels. Specifically, as illustrated in FIG. 8, the adhesion detection module 22 constructs a histogram of the calculated amount of brightness change in the set of pixels to identify that the candidate region 100 is a deposit region 400.

FIG. 8 illustrates a histogram of the amount of brightness change for each of a plurality of sets of pixels included in one internal region 200. In the histogram illustrated in FIG. 8, the horizontal axis represents the amount of brightness change and the vertical axis represents the region frequency. FIG. 8 illustrates a histogram in a case where the candidate region 100 is a deposit region 400 and a histogram in a case where the candidate region 100 is a region of road surface reflection (region other than a deposit).

The region frequency is the number corresponding to the number of sets of pixels, and one frequency corresponds to one set of pixels. In other words, one frequency corresponds to the amount of brightness change in one set of pixels (that is, a single amount of brightness change). The region frequency is a frequency normalized such that the frequency sum is a predetermined value. That is, the sum of the region frequencies in the histogram illustrated in FIG. 8 is the same among internal regions 200 having different sizes.

As illustrated in FIG. 8, when the histogram of the deposit region 400 is compared with the histogram of the region of road surface reflection, they are similar in the region frequency in a first range, whereas in a second range, the total of region frequencies is slightly larger in the region of road surface reflection than in the deposit region 400. This is because in the region of road surface reflection, a dent in a road surface, contamination, or the like affects the region frequency in the second range.

In view of this point, the adhesion detection module 22 identifies that the candidate region 100 is a deposit region 400, based on the number of amounts of brightness change in which the amount of brightness change is in the first range and the number of amounts of brightness change in the second range in which the amount of brightness change is larger than in the first range.

Specifically, the adhesion detection module 22 identifies that the candidate region 100 is a deposit region 400, based on the sum of the region frequencies in the first range in which the amount of brightness change "0" is the minimum value and the sum of the region frequencies in the second range in which the minimum value is larger than the maximum value in the first range.

For example, when the sum of the region frequencies in the first range is equal to or larger than a predetermined value and the sum of the region frequencies in the second range is smaller than the predetermined value, the adhesion detection module 22 identifies that the candidate region 100 is a deposit region 400.

On the other hand, when the sum of the region frequencies in the first range is equal to or larger than the predetermined value and the sum of the region frequencies in the second range is equal to or larger than the predetermined value, the adhesion detection module 22 identifies that the candidate region 100 is not a deposit region 400 (is a road surface reflection region).

With this process, the adhesion detection module 22 can exclude a region corresponding to the region of road surface reflection from the candidate regions 100 and can suppress erroneous detection of the region of road surface reflection as a deposit region 400

When the sum of the region frequencies in the first range is smaller than the predetermined value, the adhesion detection module 22 identifies that the candidate region 100 is not a deposit region 400, irrespective of the sum of the region frequencies in the second range.

The adhesion detection module 22 then performs a continuity determination process as to whether the candidate region 100 is continuously determined (identified) as a deposit region 400. The continuity determination process will be described later with reference to FIG. 9.

The moving adhesion detection module 23 detects a deposit region 400 detected during moving of the vehicle as a moving deposit region, from among the deposit regions 400 detected by the adhesion detection module 22. Specifically, the moving adhesion detection module 23 detects a moving deposit region from among the regions continuously determined as deposit regions 400 in the continuity determination process by the adhesion detection module 22.

Figure 9:
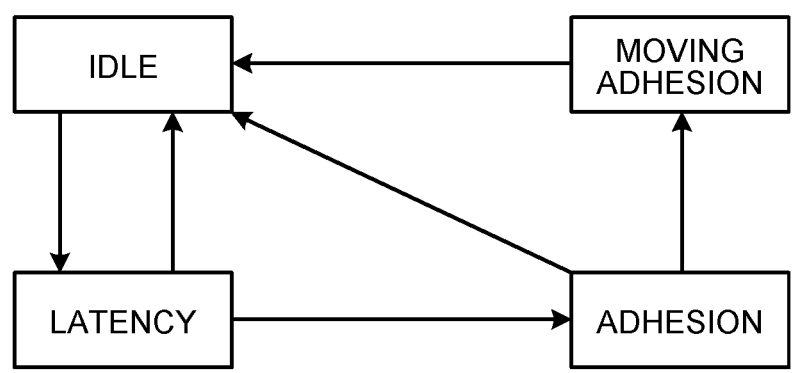
FIG. 9 is a diagram illustrating a continuity determination process by the adhesion detection module.

Referring now to FIG. 9, the continuity determination process by the adhesion detection module 22 will be described.

FIG. 9 is a diagram illustrating the continuity determination process by the adhesion detection module 22. FIG. 9 illustrates a diagram of a state machine for controlling the states of each candidate region 100 and illustrates transition of states related to a deposit in the candidate region 100.

As illustrated in FIG. 9, the candidate region 100 may make transition among four states, namely, "IDLE", "LATENCY", "ADHESION", and "MOVING ADHESION". Although the detail will be described later, when a deposit region 400 in the state of "ADHESION" is continuously determined as a deposit region 400 even during moving of the vehicle, the moving adhesion detection module 23 detects the deposit region 400 as a moving deposit region ("MOVING ADHESION").

Each state is described below.

"IDLE" indicates a state of not being determined as a deposit region 400. That is, "IDLE" indicates that the candidate region 100 has never been determined as a deposit region 400.

"LATENCY" is a state indicating that there is a possibility that a deposit adheres. That is, "LATENCY" indicates that the candidate region 100 has been determined as a deposit region 400 but the period of being continuously determined as a deposit region 400 is shorter than a predetermined period.

"ADHESION" is a state indicating that a deposit adheres. That is, "ADHESION" indicates that the period in which the candidate region 100 is continuously determined as a deposit region 400 is equal to or longer than the predetermined period. The adhesion detection module 22 identifies the candidate region 100 in the state of "ADHESION" as a deposit region 400.

"MOVING ADHESION" is a state indicating that a deposit continuously adheres even during moving of the vehicle (the vehicle speed is equal to or larger than the predetermined value). That is, "MOVING ADHESION"

indicates that the candidate region 100 has been determined as a deposit region 400 continuously for the predetermined period or longer even during moving of the vehicle. The moving adhesion detection module 23 therefore detects the candidate region 100 that has made transition to the state of "MOVING ADHESION" as a moving deposit region.

The transition between the states is described below. The transition of states can be made based on a score indicating the continuity in the determination process.

"IDLE"→"LATENCY"

For example, the adhesion detection module 22 makes transition from "IDLE" to "LATENCY" for a candidate region 100 determined to be a deposit region 400 for the first time.

"LATENCY"→"IDLE"

For example, the adhesion detection module 22 makes transition from "LATENCY" to "IDLE" when a candidate region 100 continuously determined as a deposit region 400 for a period shorter than the predetermined period is determined to be not a deposit region 400 in the captured image I at present.

"LATENCY"→"ADHESION"

For example, the adhesion detection module 22 makes transition from "LATENCY" to "ADHESION" when the period of being continuously determined as a deposit region 400 is equal to or longer than the predetermined period. When transition is made from "LATENCY" to "ADHESION", the adhesion detection module 22 outputs information on the deposit region 400 linked with the state of "ADHESION" to a determination module 24.

"ADHESION"→"IDLE"

For example, the adhesion detection module 22 makes transition from "ADHESION" to "IDLE" when a candidate region 100 continuously determined as a deposit region 400 for a period equal to or longer than the predetermined period is determined to be not a deposit region 400 in the captured image I at present.

"ADHESION"→"MOVING ADHESION"

For example, the adhesion detection module 22 makes transition from "ADHESION" to "MOVING ADHESION" when the period of being continuously determined as a deposit region 400 even during movement of the vehicle after transition to the "ADHESION" state is equal to or longer than the predetermined period. The moving adhesion detection module 23 then detects the candidate region 100 (deposit region 400) that has made transition from "ADHESION" to "MOVING ADHESION" as a moving deposit region and outputs information on the moving deposit region linked with the state of "MOVING ADHESION" to the determination module 24.

"MOVING ADHESION"→"IDLE"

For example, the adhesion detection module 22 makes transition from "MOVING ADHESION" to "IDLE" when it is determined that a candidate region is not a deposit region in the captured image I at present acquired during moving of the vehicle, in the state of "MOVING ADHESION".

In the state machine illustrated in FIG. 9, direct transition from "LATENCY" to "MOVING ADHESION" is disabled. That is, the state of "MOVING ADHESION" is brought about when the conditions above are satisfied in a period after making transition from "LATENCY" to "ADHESION".

In other words, the moving adhesion detection module 23 detects a moving deposit region when a deposit region 400 is continuously detected during moving of the vehicle in a period after the adhesion detection module 22 detects the deposit region 400 ("ADHESION").

In this way, a moving deposit region of high possibility can be detected by detecting "MOVING ADHESION" after the state enters "ADHESION".

The determination module 24 determines the presence or absence of a deposit, based on the area of the deposit region 400 detected by the adhesion detection module 22 and the area of the moving deposit region detected by the moving adhesion detection module 23.

Specifically, the determination module 24 first performs a predetermined area calculation process, based on the detected positions of the deposit region 400 and the moving deposit region. More specifically, when, in the deposit region 400, the area of the deposit region 400 at a certain position (for example, a road surface region described later) in the captured image I is equal to or larger than a predetermined value, the determination module 24 excludes the deposit region 400 with the area at the certain position from the determination process. This point is described with reference to FIG. 10.

Figure 10:
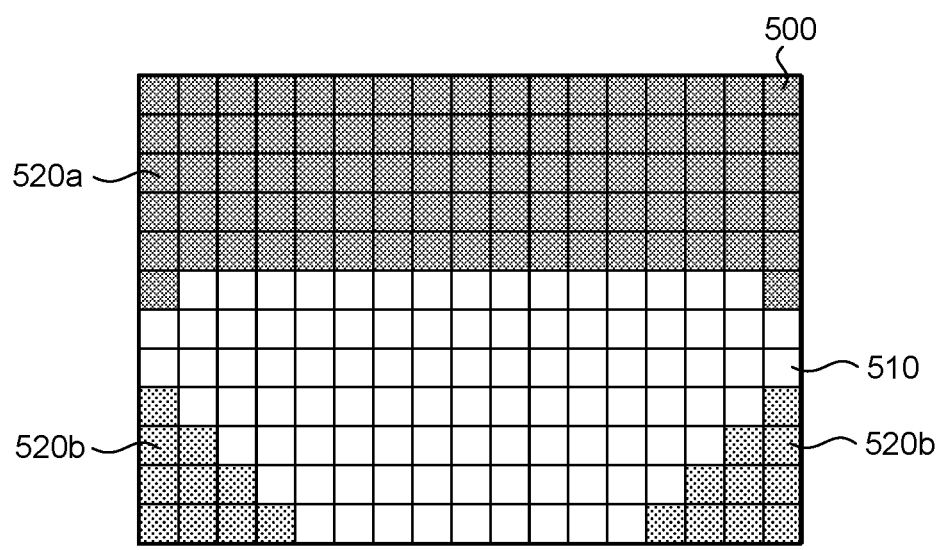
FIG. 10 is a diagram illustrating an area calculation process by a determination module.

FIG. 10 is a diagram illustrating the area calculation process for the deposit region 400 by the determination module 24. As illustrated in FIG. 10, first of all, the determination module 24 divides the entire region of the captured image I into predetermined small regions 500 and groups them into three regions 510, 520a, and 520b in each small region 500.

Specifically, the first region 510 is a region corresponding to a road surface (road surface region). The second region 520a is a region corresponding to the vehicle body (vehicle body region). The third region 520b is a region corresponding to the sky (sky).

For example, the determination module 24 detects a horizon in the captured image I and sets a region above the horizon as the third region 520b. The second region 520a is a region preset depending on the attachment position of the camera 10. The determination module 24 sets, as the first region 510, a region excluding the second region 520a and the third region 520b from the entire region of the captured image I.

The determination module 24 then converts the detected deposit region 400 into units of small regions 500 and calculates the area ratio of each of three regions 510, 520a, and 520b (in units of small regions 500) with respect to the deposit region 400. For example, letting the entire deposit region 400 be 1 (100%), the determination module 24 calculates the area ratio of the deposit region 400 in each of the regions 510, 520a, and 520b.

For example, when, of the regions 510, 520a, and 520b, the area ratio of the first region 510 is larger than the other regions 520a and 520b by at least a predetermined value, the determination module 24 uses the total area of the deposit regions 400 (excluding a moving deposit region) in the other regions 520a and 520b as the calculation result of the area calculation process. That is, when the area of the deposit region 400 in the first region 510 is equal to or larger than the predetermined value, the determination module 24 excludes the area of the deposit region 400 in the first region 510 from the determination result. In other words, the determination module 24 determines the presence or absence of a deposit by the area obtained by subtracting the area of the deposit region 400 present in the first region 510 from the entire area of the deposit region 400.

On the other hand, when the respective area ratios of the regions 510, 520a, and 520b are almost the same (the difference in area ratio among the regions 510, 520a, and 520b is smaller than a predetermined value), the determination module 24 uses the total area of respective deposit regions in the three regions 510, 520a, and 520b as the calculation result of the area calculation process. That is, when the area of the deposit region 400 in the first region 510 is smaller than the predetermined value, the determination module 24 does not exclude the area of the deposit region 400 in the first region 510 but subjects it to the determination process.

This focuses on that deposits such as rain drops often adhere evenly throughout the entire captured image I, whereas the region of road surface reflection is often concentrated in the road surface region in the captured image I.

That is, when the deposit region 400 is concentrated in the first region 510 that is the road surface region, the determination module 24 considers the deposit region 400 as the region of road surface reflection and uses the area obtained by subtracting the region of road surface reflection from the entire deposit region 400 as the calculation result of the area calculation process.

Even when the deposit region 400 is concentrated in the first region 510 that is the road surface region, if such a deposit region 400 is a moving deposit region, the determination module 24 does not subtract the deposit region 400 in the first region 510 (moving deposit region) from the entire deposit region 400.

That is, when the deposit region 400 at a certain position (the first region 510) in the captured image I is a moving deposit region, the determination module 24 does not exclude the deposit region 400 from the determination process.

This is intended to detect that a small amount of a moving deposit region of high possibility as the determination result adheres. That is, when a moving deposit region of high possibility is concentrated in the first region 510 that is the road surface region, the moving deposit region is likely to be a deposit region rather than being the region of road surface reflection and is not excluded from the determination process.

With this process, for example, even when a small amount of a moving deposit region adhering during moving of the vehicle is concentrated on the road surface region, the presence of the deposit is detected with high accuracy.

When the area calculated as the calculation result of the area calculation process is equal to or larger than a predetermined value, the determination module 24 determines that there is a deposit, and when such an area is smaller than the predetermined value, the determination module 24 determines that there is no deposit.

Specifically, the determination module 24 determines that there is a deposit when the area of the moving deposit region is equal to or larger than a first threshold value, and the determination module 24 determines that there is no deposit when the area of the moving deposit region is smaller than the first threshold value.

The determination module 24 also determines that there is a deposit when the area of the deposit region 400 ("ADHESION" and "MOVING ADHESION") calculated as the calculation result of the area calculation process is equal to or larger than a second threshold value larger than the first threshold value. On the other hand, the determination module 24 determines that there is no deposit when the area of the deposit region 400 is smaller than the second threshold value.

In this way, in the case of a moving deposit region, the determination module 24 sets the first threshold value smaller than the second threshold value, so that even when a small amount of a moving deposit region with a highly reliable determination result adheres, the moving deposition region can be detected with high accuracy.

The determination module 24 outputs the determination result indicating the presence or absence of a deposit to the flag output module 25.

The flag output module 25 outputs a deposit flag corresponding to the determination result of the determination module 24 to the various equipment 50. Specifically, the flag output module 25 outputs a deposit flag ON when the determination module 24 determines that there is a deposit and outputs a deposit flag OFF when it is determined that there is no deposit.

Figure 11:
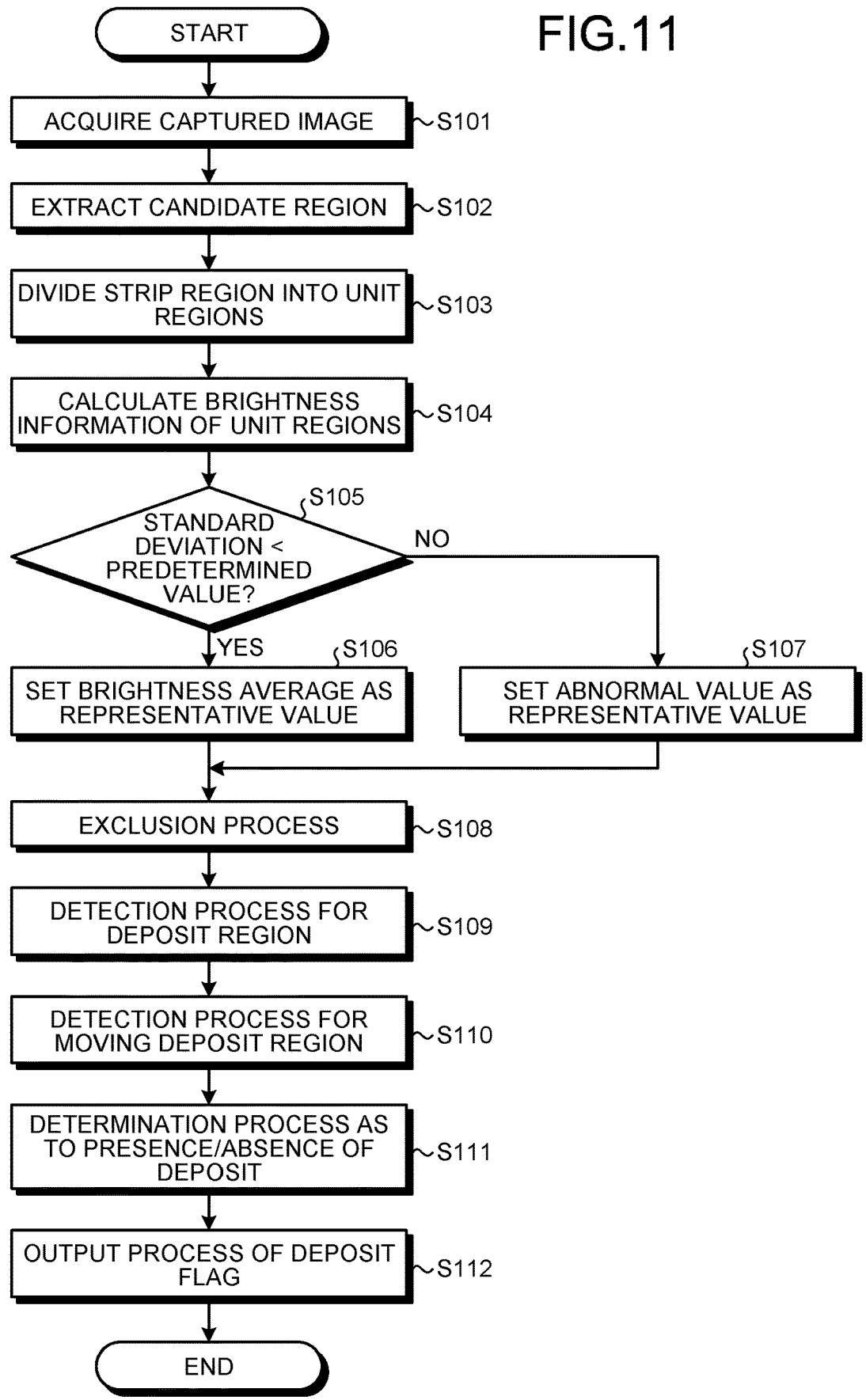
FIG. 11 is a flowchart illustrating the procedure of the entire process performed by the deposit detection device according to an embodiment.

Referring now to FIG. 11, the procedure of the entire process performed by the deposit detection device 1 according to an embodiment will be described. FIG. 11 is a flowchart illustrating the procedure of the entire process performed by the deposit detection device 1 according to an embodiment.

As illustrated in FIG. 11, first of all, the image acquisition module 21 acquires a captured image I captured by the camera 10 and performs the gray-scale process and the thinning process on the acquired captured image I, and thereafter acquires an integrated image generated based on the pixel values of the reduced captured image I, as a captured image I (S101).

Subsequently, the adhesion detection module 22 extracts a candidate region 100 for a deposit region corresponding to a deposit adhering to the camera 10, based on edges detected from the pixels of the captured image I acquired by the image acquisition module 21 (S102).

Subsequently, the adhesion detection module 22 divides a strip region 110 including a plurality of successive pixel rows in the candidate region 100 into unit regions R, each including a predetermined number of pixels as a unit (step S103).

Subsequently, the adhesion detection module 22 calculates brightness information of the unit regions R (step S104). The brightness information is, for example, an average value of brightness and a standard deviation of brightness.

Subsequently, the adhesion detection module 22 determines whether the calculated standard deviation of brightness is smaller than a predetermined value (step S105).

If the standard deviation of brightness is smaller than the predetermined value (Yes at step S105), the adhesion detection module 22 sets the average value of brightness (brightness average) as a representative value of the unit region R (step S106).

On the other hand, if the standard deviation of brightness is equal to or larger than a predetermined value (No at step S105), the adhesion detection module 22 sets an abnormal value as a representative value of the unit region R (step S107).

Subsequently, if the distribution of brightness averages of the unit regions R in the candidate region 100 satisfies a predetermined exception condition, the adhesion detection module 22 performs the exclusion process of excluding the candidate region 100 from the determination process for a deposit region (step S108).

Subsequently, the adhesion detection module 22 performs the detection process of detecting the candidate region 100 as a deposit region 400 when the undulation change in distribution of brightness averages of the unit regions R in the candidate region 100 continuously matches a predetermined change pattern (step S109).

Subsequently, if the deposit region 400 is continuously detected during moving of the vehicle, the moving adhesion detection module 23 performs the detection process of detecting the deposit region 400 as a moving deposit region (step S110).

Subsequently, the determination module 24 performs the determination process of determining the presence or absence of a deposit, based on the area of the deposit region 400 (step S111).

Subsequently, the flag output module 25 performs the output process of outputting a deposit flag corresponding to the determination result of the determination module 24 (step S112) and terminates the process.

Referring now to FIG. 12, the procedure of the detection process performed by the deposit detection device 1 according to an embodiment will be described. FIG. 12 is a flowchart illustrating the procedure of the detection process performed by the deposit detection device 1 according to an embodiment.

As illustrated in FIG. 12, the adhesion detection module 22 determines whether the candidate region 100 is determined as a deposit region 400 continuously for a predetermined period (step S201).

If the candidate region 100 is determined as a deposit region 400 continuously for the predetermined period (Yes at step S201), the adhesion detection module 22 detects the candidate region 100 as a deposit region 400 (step S202). On the other hand, if the candidate region 100 is not determined as a deposit region 400 continuously for the predetermined period (No at step S201), the adhesion detection module 22 terminates the process.

Subsequently, the moving adhesion detection module 23 determines whether the deposit region 400 is determined continuously for the predetermined period during moving of the vehicle (step S203).

If the deposit region 400 is determined continuously for the predetermined period during moving of the vehicle (Yes at step S203), the moving adhesion detection module 23 detects the deposit region 400 as a moving deposit region (step S204) and terminates the process.

As described above, the deposit detection device 1 according to an embodiment includes the adhesion detection module 22, the moving adhesion detection module 23, and the determination module 24. The adhesion detection module 22 detects a deposit region 400 corresponding to a deposit adhering to the imaging device, based on brightness information of the captured image I captured by the imaging device (camera 10). When the deposit region 400 is continuously detected during moving of the vehicle, the moving adhesion detection module 23 detects the deposit region 400 as a moving deposit region. When the area of the moving deposit region detected by the moving adhesion detection module 23 is equal to or larger than a first threshold value, the determination module 24 determines that there is a deposit. With this configuration, a deposit can be detected with high accuracy.

ADVANTAGEOUS EFFECTS OF INVENTION

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A deposit detection device for a vehicle, the deposit detection device comprising:
a processor programmed to:
extract, from an image captured by an imaging device, a plurality of candidate regions each of which is a candidate for a deposit region, each of the plurality of candidate regions being divided into a plurality of unit regions, and a representative value being set to each of the plurality of unit regions;
detect a plurality of deposit regions corresponding to a deposit adhering to the imaging device, based on brightness information of the plurality of candidate regions;
detect, from among the plurality of detected deposit regions, at least one deposit region detected during moving of the vehicle as a moving deposit region; and
determine an existence of a deposit on the imaging device when an area of the detected moving deposit region is equal to or larger than a first threshold value, wherein:
when the representative value of at least one unit region of the plurality of unit regions is an abnormal value relative to at least two adjacent unit regions, the processor is programmed to exclude the candidate region that includes the at least one unit region having the abnormal value when detecting the plurality of deposit regions;
when, in a deposit region of the plurality of detected deposit regions, an area at a certain position in the image is equal to or larger than a predetermined value, the processor is programmed to perform a process of excluding from the determination of the existence of the deposit the deposit region with the area at the certain position, and
when the deposit region with the area at the certain position is the moving deposit region, the processor is programmed to not exclude the deposit region with the area at the certain position from the determination of the existence of the deposit.

2. A deposit detection method comprising:
extracting, from an image captured by an imaging device, a plurality of candidate regions each of which is a candidate for a deposit region, each of the plurality of candidate regions being divided into a plurality of unit regions, and a representative value being set to each of the plurality of unit regions;
detecting a plurality of deposit regions corresponding to a deposit adhering to the imaging device, based on brightness information of the plurality of candidate regions;
detecting, from among the plurality of detected deposit regions, at least one deposit region detected during moving of a vehicle as a moving deposit region;
determining an existence of a deposit on the imaging device when an area of the detected moving deposit region is equal to or larger than a first threshold value;
when the representative value of at least one unit region of the plurality of unit regions is an abnormal value relative to at least two adjacent unit regions, excluding the candidate region that includes the at least one unit region having the abnormal value when detecting the plurality of deposit regions;
when, in a deposit region of the plurality of detected deposit regions, an area at a certain position in the image is equal to or larger than a predetermined value, performing a process of excluding from the determination of the existence of the deposit the deposit region with the area at the certain position; and when the deposit region with the area at the certain position is the moving deposit region, not excluding the deposit region with the area at the certain position from the determination of the existence of the deposit.

3. A deposit detection device for a vehicle, the deposit detection device comprising:
an adhesion detection module configured to (i) extract, from an image captured by an imaging device, a plurality of candidate regions each of which is a candidate for a deposit region, each of the plurality of candidate regions being divided into a plurality of unit regions, and a representative value being set to each of the plurality of unit regions, and (ii) detect a plurality of deposit regions corresponding to a deposit adhering to the imaging device, based on brightness information of the plurality of candidate regions;
a moving adhesion detection module configured to detect, from among the plurality of deposit regions detected by the adhesion detection module, a deposit region detected during moving of the vehicle as a moving deposit region; and
a determination module configured to determine an existence of a deposit when an area of the moving deposit region detected by the moving adhesion detection module is equal to or larger than a first threshold value, wherein:
when the representative value of at least one unit region of the plurality of unit regions is an abnormal value relative to at least two adjacent unit regions, the adhesion detection module excludes the candidate region that includes the at least one unit region having the abnormal value when detecting the plurality of deposit regions;
when, in a deposit region of the plurality of detected deposit regions, an area at a certain position in the image is equal to or larger than a predetermined value, the determination module performs a process of excluding from the determination of the existence of the deposit the deposit region with the area at the certain position, and
when the deposit region with the area at the certain position is the moving deposit region, the determination module does not exclude the deposit region with the area at the certain position from the determination of the existence of the deposit.

4. The deposit detection device according claim 3, wherein:
the determination module divides the image into a first region corresponding to a road surface and a second region that is a region other than the first region, and
when an area of a deposit region of the plurality of detected deposit regions in the first region is larger than an area of the deposit region in the second region by a second predetermined value, the determination module excludes the deposit region with the area in the first region from the determination of the existence of the deposit.

5. The deposit detection device according to claim 1, wherein
the processor is programmed to determine that a said candidate region is one of the plurality of detected deposit regions when an undulation of average values of brightness for the unit regions in a strip region of a plurality of strip regions of the said candidate region satisfies a predetermined change pattern.

6. The deposit detection device according to claim 1, wherein
each of the plurality of candidate regions is divided into strip regions in a vertical direction or a horizontal direction;
each of the strip regions is divided into unit regions having average values of brightness; and
when a change in an undulation of the average values of brightness for the unit regions in each of a plurality of the strip regions is within a predetermined range, the processor is programmed to exclude the candidate region that includes the plurality of the strip regions when detecting the plurality of deposit regions.

* * * * *